(12) United States Patent
Wang et al.

(10) Patent No.: US 10,474,504 B2
(45) Date of Patent: Nov. 12, 2019

(54) DISTRIBUTED NODE INTRA-GROUP TASK SCHEDULING METHOD AND SYSTEM

(71) Applicants: INSTITUTE OF ACOUSTICS, CHINESE ACADEMY OF SCIENCES, Beijing (CN); SHANGHAI 3NTV NETWORK TECHNOLOGY CO. LTD., Shanghai (CN); BEIJING HILI TECHNOLOGY CO. LTD, Beijing (CN)

(72) Inventors: Jinlin Wang, Beijing (CN); Jiali You, Beijing (CN); Xue Liu, Beijing (CN); Gang Cheng, Beijing (CN); Haojiang Deng, Beijing (CN)

(73) Assignees: INSTITUTE OF ACOUSTICS, CHINESE ACADEMY OF SCIENCES, Beijing (CN); SHANGHAI 3NTV NETWORK TECHNOLOGY CO. LTD., Shanghai (CN); BEIJING HILI TECHNOLOGY CO., LTD, Beijing (CN)

(*) Notice: Subject to any disclaimer, the term of this patent is extended or adjusted under 35 U.S.C. 154(b) by 242 days.

(21) Appl. No.: 15/528,764

(22) PCT Filed: Mar. 12, 2015

(86) PCT No.: PCT/CN2015/074087
§ 371 (c)(1),
(2) Date: May 22, 2017

(87) PCT Pub. No.: WO2016/082370
PCT Pub. Date: Jun. 2, 2016

(65) Prior Publication Data
US 2017/0329643 A1  Nov. 16, 2017

(30) Foreign Application Priority Data
Nov. 25, 2014  (CN) .......................... 2014 1 0691155

(51) Int. Cl.
*G06F 9/50*   (2006.01)
*H04L 29/06*  (2006.01)

(52) U.S. Cl.
CPC ............ *G06F 9/5038* (2013.01); *G06F 9/505* (2013.01); *H04L 29/06* (2013.01); *G06F 9/5066* (2013.01)

(58) Field of Classification Search
None
See application file for complete search history.

(56) References Cited

U.S. PATENT DOCUMENTS 7,403,993 B2 * 7/2008 John .................... G06F 16/40
                                                    709/226
7,913,257 B2 * 3/2011 Nishikawa ........... G06F 9/5066
                                                    718/102

(Continued)

FOREIGN PATENT DOCUMENTS

CN  101753608 A  6/2010
CN  103207807 A  7/2013

(Continued)

OTHER PUBLICATIONS

Chiang et al. "A Dynamic Grouping Scheduling for Heterogeneous Internet-centric Metacomputing System", 2001 IEEE, pp. 77-82.*

(Continued)

*Primary Examiner* — Van H Nguyen
(74) *Attorney, Agent, or Firm* — Gokalp Bayramoglu

(57) ABSTRACT

A distributed node intra-group task scheduling method includes: step 101) collecting resource state information and history service information about each node in a group; step 102) receiving a service request command and parsing the (Continued)

request command to obtain a request task; step 103) according to the resource state information and history service information about each node, calculating the resource utilization rate increment after each node in the group loads a task and the occupation condition of each kind of resource in the group; and according to a principle of making the resource utilization rate increment of each node in the group as low as possible and the occupation of each kind of resource in the group as balanced as possible, selecting service execution nodes in the group, and providing the request task by the selected service execution nodes.

8 Claims, 2 Drawing Sheets

(56) References Cited

U.S. PATENT DOCUMENTS

| | | | | |
|---|---|---|---|---|
| 7,984,447 | B1* | 7/2011 | Markov | G06F 9/505 |
| | | | | 709/201 |
| 8,037,475 | B1* | 10/2011 | Jackson | G06F 9/5027 |
| | | | | 718/104 |
| 8,122,441 | B2* | 2/2012 | Barsness | G06F 8/443 |
| | | | | 717/144 |
| 8,555,288 | B2* | 10/2013 | Brown | G06F 9/5033 |
| | | | | 718/100 |
| 9,825,871 | B2* | 11/2017 | Wang | H04L 41/5025 |
| 9,959,140 | B2* | 5/2018 | Jackson | G06F 9/50 |
| 2002/0059427 | A1* | 5/2002 | Tamaki | G06F 9/5027 |
| | | | | 709/226 |
| 2009/0320003 | A1* | 12/2009 | Barsness | G06F 8/443 |
| | | | | 717/146 |

FOREIGN PATENT DOCUMENTS

| | | |
|---|---|---|
| CN | 104102544 A | 10/2014 |
| WO | WO2011091323 A1 | 7/2011 |

OTHER PUBLICATIONS

Guermouche et al. "A study of various load information exchange mechanisms for a distributed application using dynamic scheduling", 2005 IEEE, pp. 77-82.*

* cited by examiner

DISTRIBUTED NODE INTRA-GROUP TASK SCHEDULING METHOD AND SYSTEM

CROSS REFERENCE TO RELATED APPLICATIONS

This application is the national phase entry of International Application No. PCT/CN2015/074087, filed on Mar. 12, 2015, which is based upon and claims priority to Chinese Patent Application No. 201410691155.4 filed on Nov. 25, 2014, the entire contents of which are incorporated herein by reference.

TECHNICAL FIELD

Technical solutions of the present invention address the issue of task scheduling in a distributed environment taking into account a plurality of performance indexes including the remaining resources, load balancing, etc., are suitable for task scheduling in the distributed environment, and particularly relate to a distributed node intra-group task scheduling method and system.

BACKGROUND OF THE INVENTION

At present, in many distributed computing environments. e.g., cloud computing, grid computing, a P2P network, etc., a request task needs to be scheduled and executed among a plurality of selectable nodes. Existing types of scheduling are based upon multi-task scheduling, workflow scheduling, etc.

Multi-task scheduling refers to that a number of concurrent tasks arrive at a cloud distributed computing environment together, where they need to be scheduled, and resources need to be allocated for them, thus requirement of load balancing of respective execution nodes can be met. Min-Min algorithm and Max-Min algorithm are commonly applied. In the Min-Min algorithm, firstly the minimum completion time for each task in the current task queue on respective processors is predicated, and then the task with the minimum completion time is allocated to a corresponding processor, and also a ready time of the corresponding processor is updated, and the allocated task is removed from the task queue; and this process is repeated to allocate the remaining tasks until the entire task queue is empty. The Min-Min algorithm tends to suffer from load unbalancing. A difference of the Max-Min algorithm from the Min-Min algorithm lies in that after the earliest completion time for each task on the respective processors is determined, the task with the maximum earliest completion time is allocated to a corresponding processor, a ready time of the corresponding processor is updated in a timely manner, and this process is repeated for the remaining tasks. The Max-Min algorithm is improved over the Min-Min algorithm in terms of load balancing.

Another type of scheduling relates to an algorithm of scheduling multiple levels of timing-related sub-tasks in some workflow so as to meet the requirements of shortening a total execution time and a total amount of consumed energy, etc. EDTS algorithm relates to optimum scheduling of N sub-tasks in a task, and in this algorithm, firstly the time and the amount of consumed energy for the respective sub-tasks executed on all the machines are predicated, and then a total length of time is set for this series of sub-tasks, and given the total length of time together with an existing timing relationship, a sub-task allocation manner which consumes energy as low as possible is found, where the task is decomposed and scheduled for optimum performance thereof.

In most of the solutions above, the computing and resources allocation of scheduling scheme are performed by a central server, however, centralized computing may not be practicable in a large-scale distributed network, e.g., a large-scale computing cluster, a P2P network, or another distributed computing environment because it is difficult for the efficiency and the computing overhead thereof to meet the requirements of real-time, quasi-real-time, and other applications.

SUMMARY OF THE INVENTION

The invention proposes a distributed scheduling method suitable for solving the condition of single task under a node group constrained by multiple resources and containing multiple service nodes.

In order to attain the object above, the invention provides a distributed node intra-group task scheduling method, the method comprising:

step 101) collecting resource state information and history service information about each node in a group;

step 102) receiving a service request command, and parsing the request command to obtain a request task; and step 103) calculating a resource utilization rate increment after each node in the group loads a task and an occupation condition of each kind of resource in the group according to the resource state information and the history service information about each node;

selecting service execution nodes in the group according to a principle of making the resource utilization rate increment of each node in the group as low as possible and the occupation of each kind of resource in the group as balanced as possible, and providing the request task by the selected service execution nodes.

Optionally the step 101) above further comprises:

step 101-1) maintaining, by each node in the group, the resource state information and the history service information of the present node;

step 101-2) transmitting, by each node, the maintained resource state information and history service information to a scheduling execution node, wherein the scheduling execution node is configured to select an execution node in the group for a specific task, and to receive the service request command O of a user.

Parsing the request command comprises: calculating and estimating according to the history service information of the task demand, and obtaining a task demanded resource vector $O=\{o_1, o_2, \ldots, o_N\}$ of the task for N kinds of resources; wherein the history service information comprises actual demand for resources and running time of each executed task.

Optionally the step 103) above further comprises:

step 103-1) calculating a resource occupation rate of each node in the group according to the resource state information of the node, wherein the resource state information of the node comprises an available resource vector of the node and an occupied resource vector of the node, by equations of:

$$rc_j = \{c_{1,j}, c_{2,j}, \ldots, c_{N,j}\}$$

$$c_{i,j} = (s_{i,j} - so_{i,j})/s_{i,j}$$

wherein $rc_j$ represents the current resource occupation rate vector of any one node $p_j$ in the group, and $c_{i,j}$ represents an occupation rate of the i-th kind of resource for the node $p_j$;

step 103-2) calculating a resource occupation rate of each kind of resource of the node $p_j$ over which the task O allocated to the present node is executed:

step 103-3) calculating an occupation rate increment of each kind of resource of the node $p_j$ after the task O is loaded onto the present node as compared with before it is loaded, that is, a difference between the resource occupation rate obtained in the step 103-2) and the resource occupation rate obtained in the step 103-1), and further obtaining a resource occupation rate increment vector of the task O for any one node $p_j$ in the group;

step 103-4) obtaining a resource occupation influence rate of the node $p_j$ according to each element in the resource occupation rate increment vector;

obtaining an intra-node resource balance degree $\sigma_j$ according to a variance among the occupation rates of different types of resources of the node $p_j$ by an equation of:

$$\sigma_j = \frac{\sum_{i=1}^{N}(ro_{i,j} - \overline{rt_j})^2}{N}$$

wherein $$\overline{rt_j} = \frac{\sum_{i=1}^{N} ro_{i,j}}{N},$$

$ro_{i,j}$ represents the occupation rate of the i-th type of resource over which the node $p_j$ executes the task O, N represents the total number of types of resources supportable by all the nodes in the group of nodes, and i represents any one type of resource;

step 103-5) determining nodes with lower resource balance degrees $\sigma_j$ and lower resource occupation influence rates $\mu_j$ in the group of nodes as execution nodes to obtain an execution node set $P_K$ by an equation of:

$$P_K=\{p_k\}=\mathrm{argmin}(\mu_j,\sigma_j)^T, \in [1,M'].$$

wherein M' represents the number of nodes in the eligible execution node set, and argmin represents a corresponding node which makes $\mu_j$ and $\sigma_j$ get minimum values; and step 103-6) selecting a node in the execution node set $P_K$ as a final execution node, and then forwarding the task O to the final execution node for processing.

In order to perform the method above, the invention provides a distributed node intra-group task scheduling system, the system comprising:

an information collecting module in each node in a group, used for collecting resource state information and history service information of the present node;

a service command receiving module in a scheduling execution node in the group, used for receiving a service request command, and parsing the request command to obtain a request task; and a scheduling processing module in the scheduling execution node in the group, used for calculating a resource utilization rate increment after each node in the group loads a task and an occupation condition of each kind of resource in the group according to the resource state information and the history service information about each node:

selecting service execution nodes according to a principle of making the resource utilization rate increment as low as possible and the occupation of each kind of resource as balanced as possible, and providing the request task by the service execution nodes.

Optionally the information collecting module further comprises:

an information obtaining sub-module, used for obtaining the resource state information and the history service information of the present node, wherein the resource state information comprises an available resource vector of the node and an occupied resource vector of the node; and a sending sub-module, used for transmitting the maintained resource state information and history service information to the scheduling execution node, wherein the scheduling execution node is configured to select an execution node in the group for a specific task and to receive the service request command O of a user.

In summary, a group of nodes in the invention includes one or more service execution nodes which are serving entities capable of providing various types of services, wherein a node receiving a user service request O is a scheduling execution node which is a core in the group of nodes, and primarily responsible for deciding on service scheduling, computing, and related operations. Each node in the group of nodes needs to maintain resource state information and history service information of that node, and exchanges it with the scheduling execution node under some rule to prepare for a scheduling selection process. The scheduling execution node firstly calculates the resource utilization rate increment after each node in the group of nodes loads a task and the source occupation condition balance degree among various kinds of resources, as general evaluation criterions, according to the amount of resources demanded for the received task request. Thereafter scheduling nodes are selected, and the principle for selecting is to select an appropriate node as the task execution node in case that the resource utilization rate increment is as low as possible, and the occupation of different types of resources are as balanced as possible. The invention designs a distributed scheduling algorithm (where each node can take a role of the task execution node, without being globally planned) oriented to a single task, the algorithm assigns tasks reasonably under a condition of multiple resources constrain and multiple service nodes, thereby guarantees the efficiency of execution taking into account load balancing, the utilization rate of resources, and other factors so as to improve the overall service performance of the system.

The invention is technically advantageous over the prior art in that:

the algorithm in the technical solutions according to the invention is designed for a single task, assigns tasks reasonably under a condition of multiple resources constrain and multiple service nodes, thereby guarantees the efficiency of execution taking into account load balancing, the utilization rate of resources, and other factors so as to improve the overall service performance of the system.

DETAILED DESCRIPTION OF THE INVENTION

The technical solutions according to the invention will be described below in details with reference to the drawings.

Example 1

Figure 2:
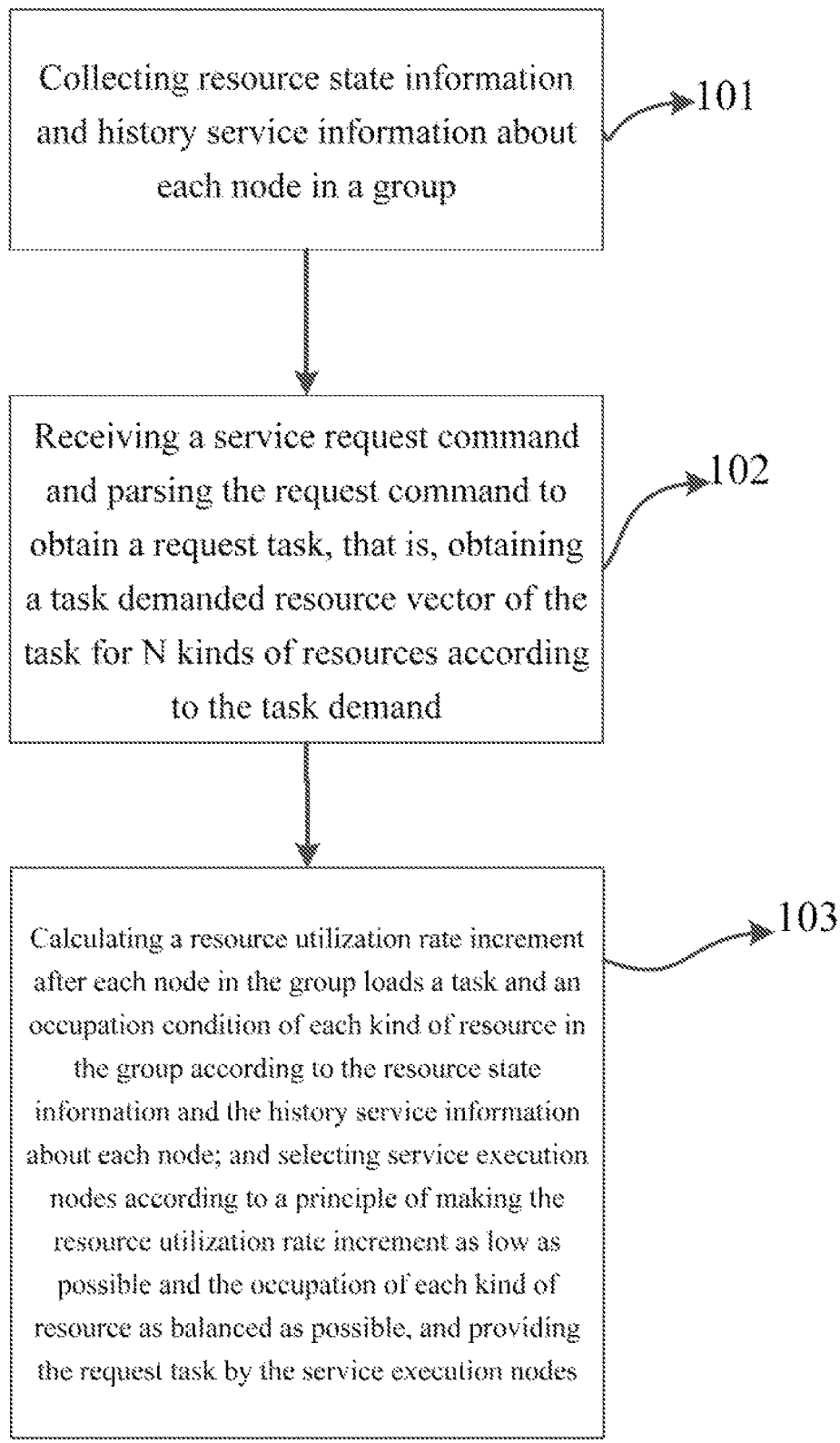
FIG. 2 is a flow chart of a method for scheduling a task according to the invention.

The invention provides a distributed node intra-group task scheduling method as illustrated in FIG. 2:

The invention proposes a method of distributed scheduling of a single task with multiple resource constraints among a group of nodes including a plurality of serving nodes. A group of nodes include one or more service execution nodes which are serving entities capable of providing various types of services, wherein a node receiving a user service request O is a scheduling execution node which is a core in the group of nodes, and primarily responsible for deciding on service scheduling, computing, and related operations. Each node in the group of nodes needs to maintain resource state information and history service information of that node, and exchanges it with the scheduling execution node under some rule to prepare for a scheduling selection process. The scheduling execution node firstly calculates the resource utilization rate increment after each node in the group of nodes loads the task and the source occupation condition balance degree among various kinds of resources, as general evaluation criterions, according to the amount of resources demanded for the received task request. Thereafter scheduling nodes are selected, and the principle for selecting is to select an appropriate node as the task execution node in case that the resource utilization rate increment is as low as possible, and the occupation of the different types of resources are as balanced as possible.

In the distributed node intra-group task scheduling method, the execution nodes are selected in the following steps:

step 1) it is assumed that a group of nodes P is $P=\{p_1, p_2, \ldots, p_j, \ldots, p_M\}$, the total amount of available resources for any one node $p_j$ in the group of nodes will be represented as $p_j=\{s_{1,j}, s_{2,j}, \ldots, s_{n,j}, \ldots s_{N,j}\}$, and occupied resources of the node $p_j$ will be represented as $po_j=\{so_{1,j}, so_{2,j}, \ldots, so_{N,j}\}$.

Here N represents the total number of types of resources supportable by all the nodes in a group of nodes, and $s_{n,j}$ represents an upper limit of the n-th type of resource on the node $p_j$ when the node $p_j$ keeps normal operation, the types of resources include but not limited to CPU, memory, and hard disk; and the upper limit of resource can be a system upper limit or a preset upper limit.

A resource demand vector of the task corresponding to the service request command received by the scheduling execution node is represented as $O=\{o_1, o_2, \ldots, o_N\}$, where $o_i$ represents the total amount of the i-th type of resources in the group of nodes demanded for the task request; the resources demanded for the task request can be calculated and estimated through a system preset value or history information; and the types of demanded resources include but not limited to a number of CPUs, a size of memory, and a size of hard disk.

step 2) the amount of remaining resources of the N different kinds of resources of the node $p_j$ can be known from the total amount of available resources, and the amount of occupied resources of the node $p_j$ on the N kinds of resources, and the current resource occupation rate vector can be calculated as $rc_j=\{c_{1,j}, c_{2,j}, \ldots, c_{N,j}\}$, wherein, the occupation rate of the i-th kind of resource is $c_{i,j}=(s_{i,j}-so_{i,j})/s_{i,j}$, and if the node $p_j$ processes the task O, the occupation rate of the resource will be $ro_j=\{r_{1,j}, r_{2,j}, \ldots, r_{N,j}\}$, wherein $r_{i,j}=(s_{i,j}-so_{i,j}-o_i)/s_{i,j}$, $\delta_{i,j}=ro_{i,j}-rc_{i,j}$, is defined to represent an increment of the occupation rate of the i-th kind of resource after the task O is loaded onto the node $p_j$ as compared before it is loaded, so a resource occupation rate increment vector of the task O for the node $p_j$ is $\Delta=\{\delta_{1,j}, \delta_{2,j}, \ldots, \delta_{i,j}\}$, $$\mu_j = \frac{\sum_{i=1}^{N} \delta_{i,j}}{N};$$

and an intra-node source balance degree refers to a variance among the resource occupation rate of the different types of resources, $$\sigma_j = \frac{\sum_{i=1}^{N}(ro_{i,j} - \overline{rt_j})^2}{N},$$

wherein $$\overline{rt_j} = \frac{\sum_{i=1}^{N} ro_{i,j}}{N}.$$

step 3) if the node $p_j$ processes the task O, and the occupation rate of the i-th kind of resource thereof is $r_{i,j} > TR_i$, the node $p_j$ will be removed from the group of nodes, thus resulting in a group of remaining nodes, $P'=\{p'_1, p'_2, \ldots, p'_j, \ldots, p'_{M'}\}$; and a resource occupation rate increment vector of the task O for a node $p'_j$, $\Delta$ and $\mu_j$, and the intra-node resource balance degree, $\sigma_j$, will be calculated.

step 4) our objective is to select such nodes that have good balance degree, i.e., small $\sigma_j$, and small resource occupation influence, i.e., small $\mu_j$ as the execution nodes, so the optimization objective is to select an appropriate node set $P_K$ that satisfies:

$$P_K=\{p_k\}=\mathrm{argmin}(\mu_j,\sigma_j)^T, j\in[1,M']$$

Figure 1:
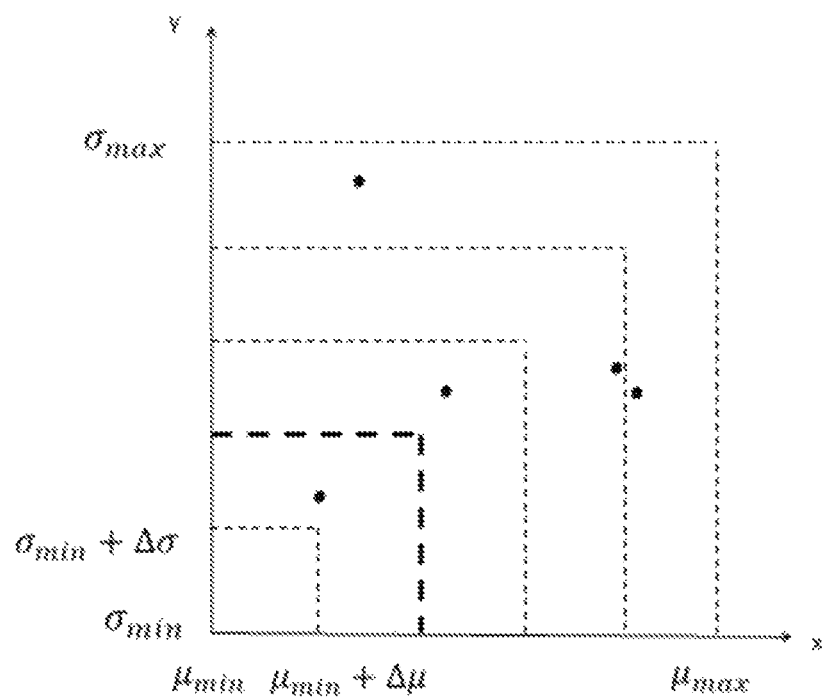
FIG. 1 is a schematic diagram of searching for a scheduling node according to the invention.

The problem above is a multi-objective optimization problem which can be solved as appropriate by a number of methods including a gradient descent method, a genetic algorithm, a particle swarm algorithm, and an ant colony algorithm, so that an eligible node set is obtained, and one of the nodes is selected as a final decision node, possibly in a number of selection strategies including but not limited to a strategy of selecting a node randomly, according to a certain probability distribution, or under a certain criterion. In the embodiment of the invention, an appropriate solution will be calculated (that is, the problem will be solved to get an execution node set $P_k$) by a method as follows (as illustrated in FIG. 1):

step a) a balance degree search step is defined as $\Delta\sigma=(\sigma_{max}-\sigma_{min})/M'$, wherein $\sigma_{max}$ and $\sigma_{min}$ are the maximum and minimum ones of the $\sigma$ values corresponding to all the nodes in the group of nodes P' respectively; and a resource occupation rate increment step is defined as $\Delta\mu=(\mu_{max}-\mu_{min})/M'$, wherein $\mu_{max}$ and $\mu_{min}$ are the maximum and minimum ones of the μ values corresponding to all the nodes in the group of nodes P' respectively;

step b) the search space with $x \in [\mu_{min}, \mu_{max}]$ and $y \in [\sigma_{min}, \sigma_{max}]$ is searched for optimum values, wherein initially $x(0)=\mu_{min}$, $y(0)=\sigma_{min}$, and $t=0$;

step c) if there is no node satisfying $\mu \ll x(t)$ and $\rho \ll y(t)$, then $x(t+1)=x(t)+\Delta\mu$, $y(t+1)=y(t)+\Delta\sigma$, and $t=t+1$, and this step c) is repeated; and if there is a node $p_k$ satisfying the conditions, then the node will be added to an eligible node set $p_k$ as a scheduling node; and the process above is terminated, and information about the node set is output.

With the process above, the eligible node set $p_k$ is obtained, and one of the nodes $p_k$ is selected as a final decision node, possibly in a number of selection strategies including but not limited to a strategy of selecting a node randomly, according to a certain probability distribution, or under a certain criterion.

step 5) the node $p_k$ selected in the step 4) is the final execution node for the task O, and the scheduling node forwards the task O to the node $p_k$ for processing.

Example 2

The invention further provides a distributed node intra-group task scheduling system, the system comprises:

an information collecting module in each node in the group, used for collecting resource state information and history service information of the present node;

a service command receiving module in the scheduling node in the group, used for receiving a service request command, and parsing the request command to obtain a request task; and a scheduling processing module in the scheduling execution node in the group, used for:

calculating a resource utilization rate increment after each node in the group loads a task and an occupation condition of each kind of resource in the group according to the resource state information and the history service information about each node:

selecting service execution nodes according to a principle of making the resource utilization rate increment as low as possible and the occupation of each kind of resource as balanced as possible, and providing the request task by the service execution nodes.

Optionally the information collecting module further comprises:

an information obtaining sub-module, used for obtaining the resource state information and the history service information of the present node, wherein the resource state information comprises an available resource vector of the node and an occupied resource vector of the node; and a sending sub-module, used for transmitting the maintained resource state information and history service information to the scheduling execution node, wherein the scheduling execution node is configured to select an execution node in the group for a specific task, and to receive the service request command O of a user.

Optionally the information obtaining sub-module is further configured to parse the request command, and to obtain a task demanded resource vector $O=\{o_1, o_2, \ldots o_N\}$ of the request task for N kinds of resources according to the task demand.

Further optionally the scheduling processing module further comprises:

a first processing sub-module, used for to calculating resource occupation rate of the nodes according to the resource state information of the nodes by equations of:

$$rc_j = \{c_{1,j}, c_{2,j}, \ldots c_{N,j}\}$$

$$c_{i,j} = (s_{i,j} - so_{i,j})/s_{i,j}$$

wherein $rc_j$ represents the current resource occupation rate vector of any one node $p_j$ in the group, and $c_{i,j}$ represents an occupation rate of the i-th kind of resource for the node $p_j$;

a second processing sub-module, used for calculating the resource occupation rate for allocating the task O to the node $p_j$ for processing:

a third processing sub-module, used for calculating the occupation rate increment of the i-th kind of resource after the task O is loaded onto the node $p_j$ as compared with before it is loaded, and further obtaining a resource occupation rate increment vector of the task O for any one node $p_j$ in the group;

a resource occupation influence rate obtaining sub-module, used for obtaining a resource occupation influence rate of the node $p_j$ according to respective elements in the resource occupation rate increment vector;

an intra-node resource balance degree obtaining sub-module, used for obtaining an intra-node resource balance degree $\sigma_j$ according to a variance among the occupation rates of the different types of resources by an equation of:

$$\sigma_j = \frac{\sum_{i=1}^{N}(ro_{i,j} - \overline{rt_j})^2}{N}$$

wherein $$\overline{rt_j} = \frac{\sum_{i=1}^{N} ro_{i,j}}{N},$$

$ro_{i,j}$ represents the occupation rate of the i-th type of resource over which the node $p_j$ executes the task O, N represents the total number of types of resources supportable by all the nodes in the group of nodes, and i represents any one type of resource;

an execution node set obtaining sub-module, used for determining nodes with lower resource balance degrees $\sigma_j$ and lower resource occupation influence rates $\mu_j$ in the group of nodes as execution nodes, so as to get an execution node set $P_k$, specifically the node set $P_k$ is obtained by the equation of:

$$P_K = \{p_k\} = \operatorname{argmin}(\mu_j, \sigma_j)^T, j \in [1, M'].$$

wherein M' represents the number of nodes in the execution node set meeting the conditions, and argmin represents a corresponding node which makes $\mu_j$ and $\sigma_j$ get minimum values; and a selecting sub-module, used for selecting a node in the execution node set $P_k$ as a final execution node, and further forwarding the task O to the final execution node for processing.

The above types of resources comprise a number of CPUs, memory capacity, or hard disk capacity.

In summary, the invention proposes a distributed scheduling method suitable for solving the condition of a single task under a node group constrained by multiple resources and containing multiple service nodes. A group of nodes includes one or more service execution nodes which are serving entities capable of providing various types of services, wherein a node receiving a user service request O is a scheduling execution node which is a core in the group of nodes, and primarily responsible for deciding on service scheduling, computing, and related operations. Each node in the group of nodes needs to maintain resource state information and history service information of that node, and exchanges it with the secluding execution node under a certain rule to prepare for a scheduling selection process. The scheduling execution node firstly calculates a resource utilization rate increment after each node in the group loads a task and a resource occupation balance degree among different kinds of resources as main evaluation criterions according to the amount of resources demanded for the received task request. Thereafter a scheduling node is selected according to a principle of selecting an appropriate node as the task execution node in case that the resource utilization rate increment is as low as possible and the occupation of different types of resources is as balanced as possible.

Finally it should be explained that the aforementioned embodiments are merely used for illustrating rather than limiting the technical solution of the present invention. Although the present invention has been described in detail with reference to the embodiments, those skilled in the art will understand that modifications or equivalent substitutions can be made to the technical solutions of the present invention without departing from the spirit and scope of the technical solutions of the present invention, and thereby should all be encompassed within the scope of the claims of the present invention.

What is claimed is:

1. A distributed node intra-group task scheduling method, the method comprising:

step 101), collecting resource state information and history service information about each node in a group;

step 102), receiving a service request command, and parsing the request command to obtain a request task; and step 103), calculating a resource utilization rate increment after each node in the group loads a task and an occupation condition of each kind of resource in the group according to the resource state information and the history service information about each node; and selecting service execution nodes in the group according to a principle of making the resource utilization rate increment of each node in the group as low as possible and the occupation of each kind of resource in the group as balanced as possible, and providing the request task by the selected service execution nodes the step 103) further comprises:

step 103-1), calculating a resource occupation rate of each node in the group according to the resource state information of the node, wherein the resource state information of the node comprises an available resource vector of the node and an occupied resource vector of the node, by equations of:

$$rc_j = \{c_{1,j}, c_{2,j}, \ldots, c_{N,j}\}, \text{ and}$$

$$c_{i,j} = (s_{i,j} - so_{i,j})/s_{i,j},$$

wherein $rc_j$ represents the current resource occupation rate vector of any one node $p_j$ in the group, and $c_{i,j}$ represents an occupation rate of the i-th kind of resource for the node $p_j$;

step 103-2), calculating a resource occupation rate of each kind of resource of the node $p_j$ over which the task O allocated to the present node is executed;

step 103-3), calculating an occupation rate increment of each kind of resource of the node $p_j$ after the task O is loaded onto the present node as compared with before it is loaded, that is, a difference between the resource occupation rate obtained in the step 103-2) and the resource occupation rate obtained in the step 103-1), and further obtaining a resource occupation rate increment vector of the task O for any one node $p_j$ in the group;

step 103-4), obtaining a resource occupation influence rate of the node $p_j$ according to each element in the resource occupation rate increment vector;

obtaining an intra-node resource balance degree $\sigma_j$ according to a variance among the occupation rates of different types of resources of the node $p_j$ by an equation of:

$$\sigma_j = \frac{\sum_{i=1}^{N}(ro_{i,j} - \overline{rt_j})^2}{N},$$

wherein $$\overline{rt_j} = \frac{\sum_{i=1}^{N} ro_{i,j}}{N},$$

$ro_{i,j}$ represents the occupation rate of the i-th type of resource over which the node $p_j$ executes the task O, N represents the total number of types of resources supportable by all the nodes in the group of nodes, and i represents any one type of resource;

step 103-5), determining nodes with lower resource balance degrees $\sigma_j$ and lower resource occupation influence rates $\mu_j$ in the group of nodes as execution nodes to obtain an execution node set $P_K$ by an equation of:

$$P_K = \{p_k\} = \operatorname{argmin}(\mu_j, \sigma_j)^T, j \in [1, M'],$$

wherein M' represents the number of nodes in the eligible execution node set, and argmin represents a corresponding node which makes $\mu_j$ and $\sigma_j$ get minimum values; and step 103-6), selecting a node in the execution node set $P_K$ as a final execution node by a method comprising but not limited to selecting a node randomly, according to some probability distribution, or under a certain criterion, and then forwarding the task O to the final execution node for processing.

2. The distributed node intra-group task scheduling method according to claim 1, wherein the step 101) further comprises:

step 101-1), maintaining, by each node in the group, the resource state information and the history service information of the present node; and step 101-2), transmitting, by each node, the maintained resource state information and history service information to a scheduling execution node, wherein the scheduling execution node is configured to select an execution node in the group for a specific task, and to receive the service request command of a user.

3. The distributed node intra-group task scheduling method according to claim 1, wherein parsing the request command comprises: calculating and estimating according to the history service information of the task demand, and obtaining a task demanded resource vector $O=\{o_1, o_2, \ldots, o_N\}$ of the task for N kinds of resources;
wherein the history service information comprises actual demand for resources and running time of each executed task.

4. The distributed node intra-group task scheduling method according to claim 1, wherein obtaining the execution node set $P_K$ comprises:
step 1), defining a balance degree search step as $\Delta\sigma = (\sigma_{max}-\sigma_{min})/M'$, wherein $\sigma_{max}$ and $\sigma_{min}$ are maximum and minimum ones of $\sigma$ values corresponding to all the nodes in the group of nodes P' respectively;
step 2), defining a resource occupation rate increment step as $\Delta\mu=(\mu_{max}-\mu_{min})/M'$, wherein $\mu_{max}$ and $\mu_{min}$ are maximum and minimum ones of $\mu$ values corresponding to all the nodes in the group of nodes P' respectively;
step 3), searching a search space with $x\in[\mu_{min}, \mu_{max}]$ and $y\in[\sigma_{min}, \sigma_{max}]$ for optimum values, wherein initially $x(0)=\mu_{min}$, $y(0)=\sigma_{min}$, and $t=0$; and
step 4), if there is no node satisfying $\mu<<x(t)$ and $\rho<<y(t)$, then determining that $x(t+1)=x(t)+\Delta\mu$, $y(t+1)=y(t)+\Delta\sigma$, and $t=t+1$, and repeating the step 4); and if there is a node $p_k$ satisfying the conditions, then adding the node to the eligible node set $P_K$ to form a scheduling node set; and terminating the process above, and outputting information about the node set.

5. A distributed node intra-group task scheduling system, the system comprising: a processor, configured to execute the following program modules stored in a memory:
an information collecting module in each node in a group, configured to collect resource state information and history service information of the present node;
a service command receiving module in a scheduling execution node in the group, configured to receive a service request command, and to parse the request command to obtain a request task; and
a scheduling processing module in the scheduling execution node in the group, configured to:
calculate a resource utilization rate increment after each node in the group loads a task and an occupation condition of each kind of resource in the group according to the resource state information and the history service information about each node; and
select service execution nodes according to a principle of making the resource utilization rate increment as low as possible and the occupation of each kind of resource as balanced as possible, and provide the request task by the service execution nodes;
the scheduling processing module further comprises:
a first processing sub-module configured to calculate a resource occupation rate of a node according to the resource state information of the node by an equations of:

$rc_j=\{c_{1,j}, c_{2,j}, \ldots, c_{N,j}\}$, and $c_{i,j}=(s_{i,j}-so_{i,j})/s_{i,j}$, wherein $rc_j$ represents a current resource occupation rate vector of any one node $p_j$ in the group, and $c_{i,j}$ represents an occupation rate of the i-th kind of resource for the node $p_j$;

a second processing sub-module configured to calculate an occupation rate of the resources over which the task O allocated to the node $p_j$ is executed;
a third processing sub-module configured to calculate an occupation rate increment of the i-th kind of resource after the task O is loaded onto the node $p_j$ as compared with before it is loaded, and to further obtain a resource occupation rate increment vector of the task O for any one node $p_j$ in the group;
a resource occupation influence rate obtaining sub-module configured to obtain a resource occupation influence rate of the node $p_j$ according to each element in the resource occupation rate increment vector;
an intra-node resource balance degree obtaining sub-module configured to obtain an intra-node resource balance degree $\sigma_j$ according to a variance among the occupation rates of different types of resources by an equation of:

$$\sigma_j = \frac{\sum_{i=1}^{N}(ro_{i,j}-\overline{rt_j})^2}{N}$$

wherein $$\overline{rt_j} = \frac{\sum_{i=1}^{N}ro_{i,j}}{N},$$

$ro_{i,j}$ represents the occupation rate of the i-th kind of resource over which the node $p_j$ executes the task O, N represents the total number of types of resources supportable by all the nodes in the group of nodes, and i represents any one type of resource;
an execution node set obtaining sub-module configured to determine nodes with lower resource balance degrees $\sigma_j$ and lower resource occupation influence rates $\mu_j$ in the group of nodes as execution nodes to obtain an execution node set $P_K$ by an equation of:

$P_K=\{p_k\}=\mathrm{argmin}(\mu_j,\sigma_j)^T, \in[1,M']$, wherein M' represents the number of nodes in the eligible execution node set, and argmin represents a corresponding node which makes $\mu_j$ and $\sigma_j$ get minimum values; and
a selecting sub-module configured to select a node in the execution node set $P_K$ as a final execution node, and then forward the task O to the final execution node for processing.

6. The distributed node intra-group task scheduling system according to claim 5, wherein the information collecting module further comprises:
an information obtaining sub-module configured to obtain the resource state information and the history service information of the present node, wherein the resource state information comprises an available resource vector of the node and an occupied resource vector of the node; and
a sending sub-module configured to transmit the maintained resource state information and history service information to the scheduling execution node, wherein the scheduling execution node is configured to select an execution node in the group for a specific task and to receive the service request command of a user.

7. The distributed node intra-group task scheduling system according to claim 5, wherein the information obtaining sub-module is further configured to parse the request command, and to obtain a task demanded resource vector $O=\{o_1, o_2, \ldots, o_N\}$ of the request task for N kinds of resources according to the task demand.

8. The distributed node intra-group task scheduling system according to claim 5, wherein the types of resources comprise a number of CPUs, memory capacity, or hard disk capacity.

* * * * *